US005204945A

United States Patent [19]

Sakaibara et al.

[11] Patent Number: 5,204,945

[45] Date of Patent: Apr. 20, 1993

[54] METHOD OF DISPLAYING THICK LINE AND INFORMATION UNIT AND DISPLAY SYSTEM USED THEREFOR

[75] Inventors: Toru Sakaibara, Kawasaki; Hideyuki Hara; Ryo Fujita, both of Hitachi, all of Japan

[73] Assignee: Hitachi, Ltd., Tokyo, Japan

[21] Appl. No.: 609,615

[22] Filed: Nov. 6, 1990

[30] Foreign Application Priority Data

Nov. 8, 1989 [JP] Japan .................................. 1-290421

[51] Int. Cl.[5] .............................................. G06F 15/62

[52] U.S. Cl. .................................... 395/134; 395/133; 395/143; 395/157; 340/747

[58] Field of Search ............... 395/133, 134, 141, 143, 395/157; 340/747, 728, 729, 734, 730

[56] References Cited

U.S. PATENT DOCUMENTS 5,068,802 11/1991 Miyashita et al. .................. 395/133

FOREIGN PATENT DOCUMENTS 01-103784 of 0000 Japan .
62-127972 of 0000 Japan .
63-225882 of 0000 Japan .
61-240381 of 0000 Japan .

*Primary Examiner*—Gary V. Harkcom
*Assistant Examiner*—Phu R. Nguyen
*Attorney, Agent, or Firm*—Antonelli, Terry, Stout & Kraus

[57] ABSTRACT

The display system and a thick line display method realizes a high-speed and accurate display of a thick line without any disorder even if a display range is to be processed by two or more clip frames when the thick line is to be displayed by parallel setting a reference line component and at least one additional line component which is obtained by parallel moving the reference line component in a display system such as an information processing unit that displays graphs. For this purpose, a clip frame showing a display range is expanded by a predetermined width equal to or larger than the total width of additional line components to be set at least at one side of the reference line component and the additional line component is obtained in that expanded frame, and the line component within the clip frame of the additional line component and the reference line component within the clip frame are displayed.

6 Claims, 4 Drawing Sheets

METHOD OF DISPLAYING THICK LINE AND INFORMATION UNIT AND DISPLAY SYSTEM USED THEREFOR

BACKGROUND OF THE INVENTION

The present invention relates to a display system for displaying graphs such as an information processing unit, and more particularly to a method of displaying a thick line.

As a method for displaying a thick line, a technique has been generally known which generates and displays a thick line by drawing a line by a parallel movement of a reference line component in the X direction or in the Y direction, as discussed in the Japanese Patent Unexamined Publication No. JP-A-61-240381.

However, no particular consideration has been given to a clipping processing for processing a display range by two or more clip frames in the case of a multi-window environment and the like. Therefore, there arises a problem that when a clipping processing is necessary, if a parallel-moved line component is added to a reference line component after a clipping processing, a portion of a clipped end is not displayed.

This problem will be explained in detail by taking an example of a multi-window environment, with reference to FIG. 5.

In the drawing, 6 designates a monitoring screen, 91 and 92 designate windows of a multi-window, and 93 also designates a window.

In a multi-window environment, it is general that when a window is not square, a square window or a clip-framed display is carried out in order to avoid complex processing or in order to increase a processing speed.

In other words, a thick line 10 is displayed by dividing it by the clip frames 91 and 92.

Consider a case that the thick line is clipping processed by using the clip frame 91 to make a display. First, a reference line component 100 of the thick line 10 is clipped by the clip frame 91, and coordinates of start and end portions of additional line components 101 to 104 are obtained.

Then, the reference line component and the additional line components are drawn, and, then, the thick line of the portion of the clip frame 91 is displayed. In this case, the additional line component 101 and the additional line component 102 which are positioned above the reference line component 100 do not reach the clip frame 91, and some portions are not displayed. The additional line component 103 and the additional line component 104 which are positioned below the reference line component 100 exceed the clip frame 91. Therefore, they are displayed by the clipping processing.

In the case of the clip frame 92, display processing is also carried out in the similar manner. When display is carried out in the manner as described above, there occur missing portions at the border of the clip frame where one thick line should be intrinsically displayed.

As a prior art for preventing this phenomenon, a technique is known according to which coordinates of start and end points of additional lines are obtained in addition to start and end points of a reference line component before a clipping processing, then the additional line components and the reference line component are drawn and these line components are clipping processed, as described in the Japanese Patent Unexamined Publication No. JP-A-63-225882.

When coordinates of the start and end points of the additional line components are obtained in addition to the start and end points of the reference line components before the clip processing, then coordinates of the reference line components and the additional line components on the clip frame are obtained and the additional line components and the reference line component are drawn, there occurs a problem of dropouts between the adjacent lines as discribed in the Japanese Patent Unexamined Publication No. JP-A-63-225882.

SUMMARY OF THE INVENTION

In the above-described first prior art, there is a problem of dropouts at end portions in the clipping of a thick line when a display range is clipping processed by two or more clip frames in a multi-window environment or the like.

The second prior art solves the problem of the first art. However, when the processing is carried out for the line components longer than the display screen in the CAD unit or the like, it is not practical to carry out the above processing for the start and end points of the reference line component, from the viewpoint of its long required time and a large processing quantity.

It is an object of the present invention to provide a display system and a thick line display method which can quickly realize an accurate display of a thick line even if a display range is processed by two or more clip frames in a multi-window environment or the like.

In order to achieve the above object, according to the thick line display method of the present invention, a reference line component and at least one additional line component which is obtained by a parallel move of the reference line component are provided to display a thick line. In this method, a clip frame showing a display range is expanded by a predetermined width equal to or larger than the total width of additional line components to be set at least at one side of the reference line, and the additional line components are obtained in this expanded frame. Then, of the additional line components obtained, the line components within said clip frame and the reference line component within said clip frame are obtained.

Further, according to the thick line display method of the present invention, a reference line component and at least one additional line component which is obtained by a parallel move of the reference line component are provided to display a thick line. In this method, a first clipping processing is carried out to the reference line component such that the first clipping frame showing a display range is expanded by a predetermined width equal to or larger than the total width of additional line components to be set at least at one side of the reference line to obtain a second clip frame, and line components are obtained in this second clip frame. Additional line components are obtained next to the reference line component after the processing; a pixel which constitutes the reference line component that has been first clipping processed and the additional line components is obtained; a second clipping processing is carried out to the pixel obtained to obtain a pixel within the first clip frame, and the pixel obtained within the first clip frame is displayed.

Further, in order to achieve the above object, according to the thick line display system of the present invention, a reference line component and at least one additional line component which is obtained by a parallel move of the reference line component are provided to display a thick line. This system including a unit for carrying out a first clipping processing to the reference line component such that the first clip frame showing a display range is expanded by a predetermined width equal to or larger than the total width of additional line components to be set at least at one side of the reference line to have a second clip frame and such that line components are obtained in the second clip frame, a unit for obtaining a pixel which constitutes the reference line component that has been first clipping processed and the additional line components, a unit for carrying out a second clipping processing to the pixel obtained to obtain a pixel within the first clip frame, and a means for displaying the pixel obtained within the first clip frame.

Further, according to the thick line display system of the present invention, a reference line and at least one additional line component having start and end points which are obtained by a parallel movement of start and end points of the reference line components are provided to display a thick line. This system comprises a unit for carrying out a first clipping processing to the reference line component such that the first clip frame showing a display range is expanded by a predetermined width equal to or larger than the total width of additional lines to be set at least at one side of the reference line component to obtain a second clip frame and such that start and end points of the line components are obtained in the second clip frame, a unit for obtaining start and end points of the additional line components next to the reference line component obtained by the first clipping processing, a unit for generating a pixel for the reference line component and each of the additional line components from the start and end points of the reference line component obtained by the first clipping processing and each of the additional line components obtained, a unit for discriminating whether the coordinates of the pixel generated are within said first clip frame or not, and a unit for displaying the pixels generated when the pixel are within the first clip frame as a result of the discrimination. The display system may have a frame memory for storing a display image and the discrimination unit may compare a write address of the generated pixels in the frame memory with an address area of the frame memory corresponding to the first clip frame, and the display unit may write the generated pixels in the frame memory when the write address is within the address area.

Further, in order to achieve the above object, an information processing unit of the present invention provides a multi-window environment, and has a reference line component and at least one additional line component having start and end points which are obtained by a parallel move of start and end points of the reference line components thereby to display a thick line. Further, the information processing unit realizes a clipping processing of a thick line to be displayed in one window, by dividing the window into two or more clip frames and by clipping processing each of the clip frames. The information processing unit comprises, for each clip frame, a unit for carrying out a first clipping processing to the reference line component of a thick line such that the first clip frame showing a display range is expanded by a predetermined width equal to or larger than the total width of additional line components to be set at least at one side of the reference line to obtain a second clip frame and line components are obtained in the second clip frame, a unit for obtaining a pixel which constitutes the reference line component that has been first clipping processed and the additional line components obtained, a unit for carrying out a second clipping processing to the pixel obtained to obtain a pixel within the first clip frame, and a unit for displaying the pixel obtained within the first clip frame.

Regarding the above-described expansion of the clip frame width by a predetermined width equal to or larger than the total width of the additional line components to be set at least at one side of the reference line component, it is desirable that the expansion is made by the width equal to the total width of the additional line components to be set at one side of one reference line component, because this minimizes processing volume and improves the speed of processing.

Further, about the above-described expansion of the clip frame width by a predetermined width equal to or larger than the total width of the additional line components to be set at least at one side of the reference line component, when one of the start and end points of the reference line component is outside the first clip frame and when the total width of the additional line components is different between both sides of the reference line component, the width to be expanded may be the width equal to or larger than the total width of the additional line components to be set at a side where the reference line component and the first clip frame form an acute angle. Further, when both of the start and end points of the reference line component are outside the first clip frame, the width to be expanded may be equal to or larger than the total width of the additional line components of which width is the larger than the other to be set at the side where the reference line component and the first clip frame form an acute angle.

According to the thick line display method of the present invention, additional line components are obtained next to a reference line component within a frame which has been obtained by expanding the clip frame showing a display range by a predetermined width equal to or larger than the total width of additional line components to be set at least at one side of the reference line and then, the line components within the clip frame among the additional line components obtained and the reference line component within the clip frame are displayed, thus achieving a clipping processing of a thick line.

According to other method of displaying a thick line relating to the present invention, a first clipping processing is carried out to the reference line component such that the first clip frame showing a display range is expanded by a predetermined width equal to or larger than the total width of additional lines to be set at least at one side of the reference line to obtain a second clip frame and line components are obtained in the second clip frame, the additional line components are obtained for the reference line component after the processing, a pixel which constitutes the reference line component that has been first clipping processed and the additional line components obtained is obtained, a second clipping processing is carried out to the pixel obtained to obtain a pixel within the first clipping frame, and the pixel obtained within the first clip is displayed, thus realizing a clipping processing of a thick line.

According to the display system relating to the present invention, a first clipping processing is carried out to the reference line component such that the first clip frame showing a display range is expanded by a predetermined width equal to or larger than the total width of additional line components to be set at least at one side of the reference line component to obtain a second clip frame and line components are obtained within the second clip frame, a picture element which constitutes the reference line component that has been first clipping processed and the additional line component obtained is obtained, a second clipping processing is carried out to the pixel obtained to obtain a pixel within the first clip frame, and the pixel obtained within the first clip frame is displayed.

Further, according to the other display system relating to the present invention, a first clipping processing is carried out to the reference line component such that the first clip frame showing a display range is expanded by a predetermined width equal to or larger than the total width of additional line components to be set at least at one side of the reference line component to obtain a second clip frame, and start and end points of line components are obtained within the second clip frame; start and stop points of the additional line components are obtained next to the reference line component obtained by the first clipping processing, pixels for the reference line component; and each of the additional line components are generated from the start and end points of the reference line component obtained by the first clipping processing and each of the additional line components obtained, discrimination is made whether the coordinates of the pixel generated are positioned within the first clip frame or rot; and the pixels generated are displayed when the picture elements are within the first clip frame as a result of the discrimination. The display system may have a frame memory for storing a display image, and the discrimination may be carried out by comparing the write address of the generated pixels in the frame memory with the address area of the frame memory corresponding to the first clip frame, and display is realized by writing the generated pixels in the frame memory when the write address is within the address area.

Further, according to the information processing unit relating to the present invention, for each clip frame, a first clipping processing is carried out to the reference line component of a thick line such that the first clip frame showing a display range is expanded by a predetermined width equal to or larger than the total width of additional line components to be set at least at one side of the reference line component to obtain a second clip frame, and line components are obtained within the second clip frame; a pixel is obtained which constitutes the reference line component that has been first clipping processed and the additional line components obtained, a second clipping processing is carried out to the pixel obtained to obtain a pixel within the first clip frame; and the pixel obtained within the first clip frame is displayed.

The above display unit and the information processing unit may carry out the above processings only when one of the start and end points of the reference line component is located outside the first clip frame.

The above conventional problem occurs because some of the additional line components do not reach the clip frame when these additional line components are obtained by simply lateral moving the clipping processed reference line component. In other words, a disorder of display occurs because the additional line components obtained in the above method are too short.

In order to solve the above problem, coordinates of the start and end points of the additional line components are calculated after extending at least the start and end points of the reference line component to a range to be displayed. In other words, the additional line components are obtained to be longer than necessary to have a normal display.

In order to solve the above problem, according to the present invention, the reference line component is clipping processed so that the additional line components are extended to the maximum limit, and start and end points of the additional line components are obtained. Then, a clipping processing is carried out for the original clip frame. In order to obtain a maximum range of the additional line components, the additional line components are expanded vertically and horizontally by the width of additional line components at one side in excess of the original clip frame.

In these cases, the reference line is parallel moved after the clipping by the second clipping frame, and the pixels of the additional line components are drawn. Accordingly, there is no problem of the occurrence of dropout mentioned previously.

DESCRIPTION OF THE PREFERRED EMBODIMENTS

One embodiment of the display system relating to the present invention will be explained below by taking an example of a case in a multi-window environment.

Figure 1:
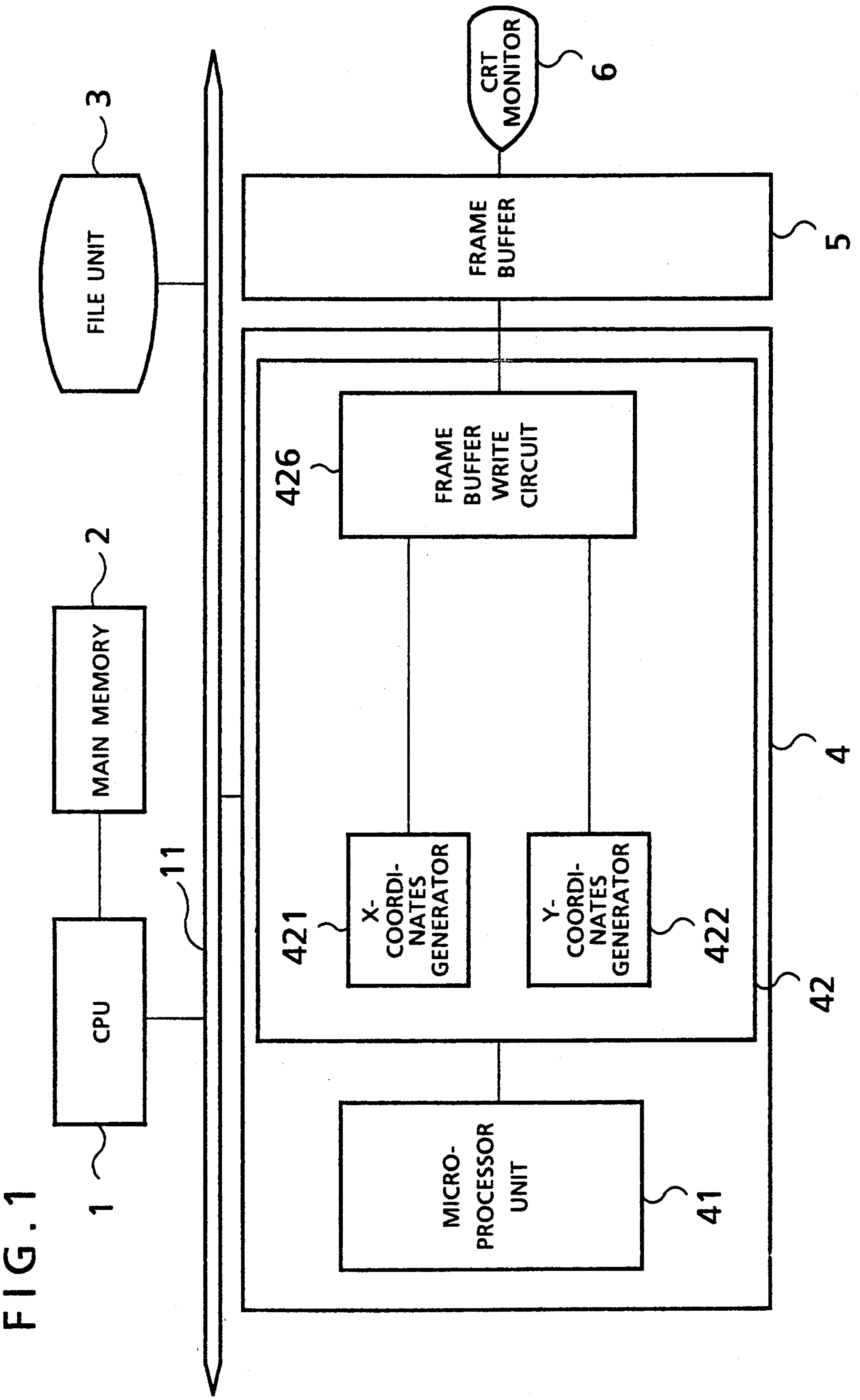
FIG. 1 is a block diagram showing the configuration of the display system relating to one embodiment of the present invention.

FIG. 1 shows a hardware configuration of the display system relating to the present embodiment.

In the Figure, 1 designates a CPU which controls a graphic processor 4 to be described later, by activating it or providing it with graphic information to be displayed such as coordinates of start and end points of a thick line and a line width; element 2 designates a main memory which stores programs and data of the CPU 1; Element 3 designates a file unit such as a magnetic disk unit which stores programs and data of the display system. Element 11 designates a system bus which connects the CPU 1, the file unit 3 and the graphic processor 4. The graphic processor 4 draws a graph in the frame buffer 5 based on an instruction from the CPU 1. The frame buffer 5 stores an image drawn by the graphic processor 4. Element 6 designates a CRT monitor which reads out image information from the frame buffer and displays it.

The graphic processor 4 comprises a microprocessor section 41 and a line component generator 42. The microprocessor section 41 carries out geometric processing to have a graphical display such as coordinates conversion, clipping processing by a geometric calculation and calculation of coordinates of start and end points of additional line components, and supplies drawing line component information, such as coordinates of start and end points of line components to be drawn, to the line component generator 42 to make the line component generator 42 carry out a line component drawing processing. Based on the assigned line component information, the line component generator 42 writes predetermined colors at a position of the frame buffer 5 corresponding to the pixel which includes the line components.

Operation of the above configuration will be explained below.

The outline of the processing will be explained first.

Figure 4:
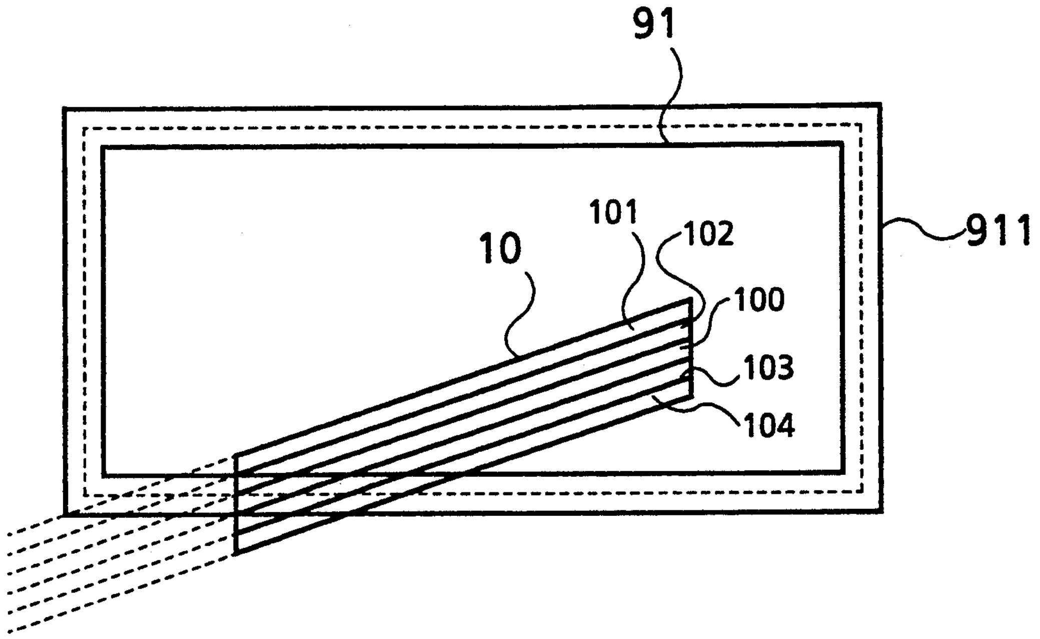
FIG. 4 is an explanatary diagram showing the concept of the thick line display processing.
Figure 5:
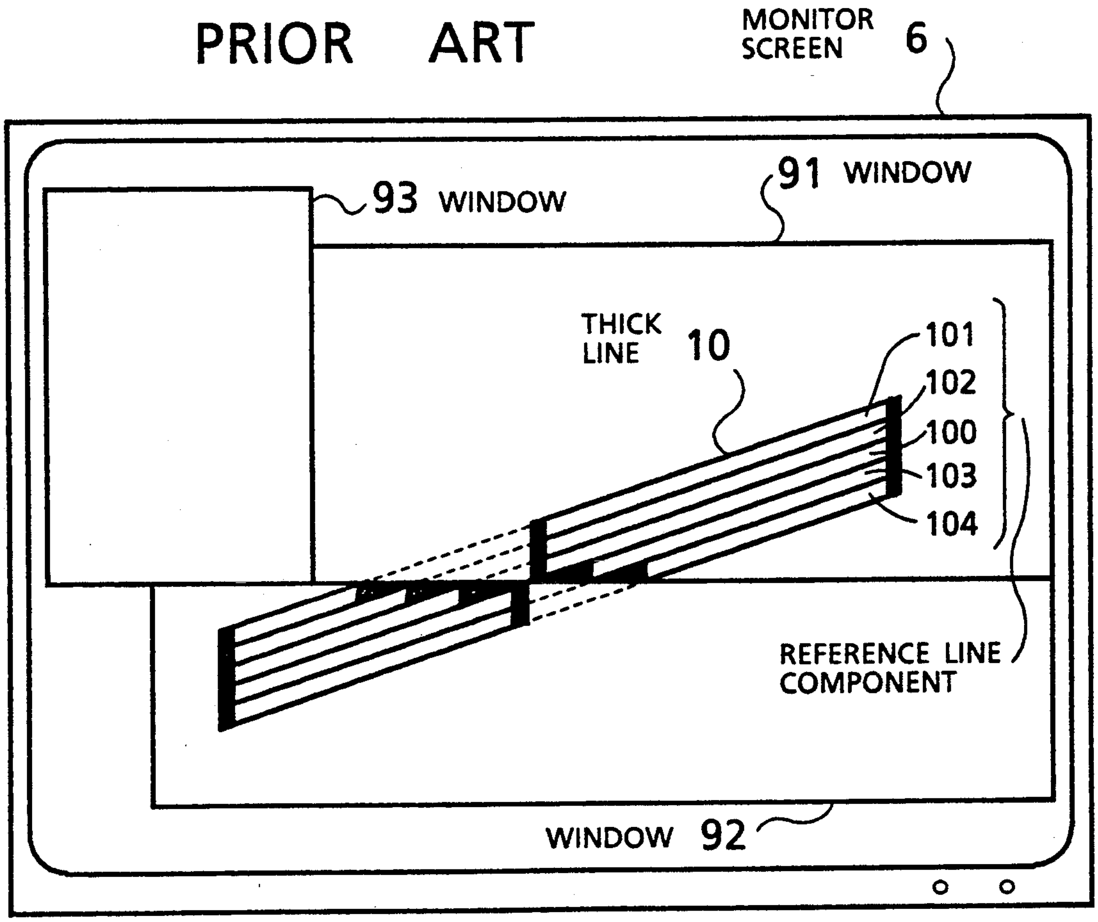
FIG. 5 PRIOR ART
FIG. 5 is an explanatery diagram showing the problem of the prior art.

As shown in FIG. 4, when a thick line 10 is to be displayed, a reference line component is clipped by a clip frame 911, the width of which has been expanded by the width of the additional line components at one side, that is the width of two additional line components, from the clip frame 91. Based on this clipping processing, start and end points of the additional line components are obtained according to the conventional method.

In this case, the clip point of an additional line component 101 which is the longest in the original clip frame is just brought into contact with the original clip frame so that none of the pixel to be displayed is missed.

Meanwhile, the reference line component and additional line components 102 to 104 are positioned outside of the original clip frame 91. These line components are clipping processed by the original clip frame to make a display.

The above clipping processing may be carried out by extracting coordinates points within the clip frame after drawing, or by drawing only the inside after discriminating the existence of line components either inside or outside of the clip frame after calculating the coordinates of a pixel when the line components are generated, as described later.

Details of the operation will be explained next.

Figure 3:
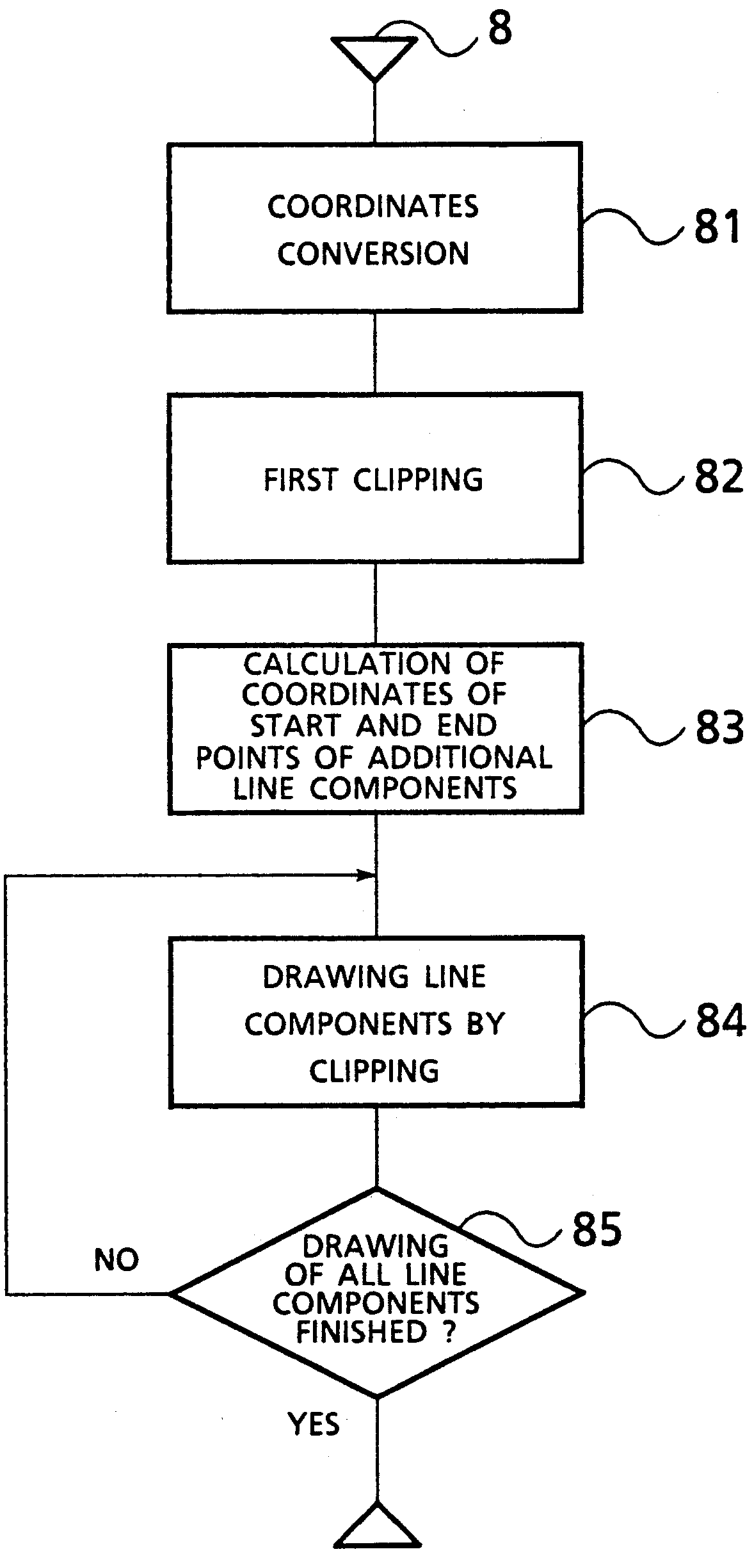
FIG. 3 is a flow chart showing the processing procedure of the microprocessor section.

FIG. 3 shows a processing procedure of the microprocessor section 41.

First, the microprocessor section 41 changes coordinates of the start and end points of the display line components to the display coordinates system in Step 81. Changing coordinates of a graph is generally carried out to make a graphic display.

Next in Step 82, a first clipping processing is carried out by a clip frame the width of which has been expanded by the width of the additional line components at one side.

Next, in Step 83, coordinates of the start and end points of the additional line components are carried out. This may be based on the conventional method of calculating start and end points coordinates of the additional line components after obtaining a direction of a parallel move from the reference line component based on a slope of a thick line. In Step 84, a clipping processing is carried out by using the original clip frame and the line components are drawn by using the line component generator 42.

In Step 85, discrimination is made whether all of the reference line component, and the additional line components have been drawn or not; and Step 84 is repeated until all is completed.

As described above, start and end points of the additional line components are obtained and drawn for the start and end points of the reference line components that have been obtained by clipping by the clip frame the width of which has been expanded by the width of the additional line components at one side. Therefore, it is possible to avoid the occurrence of a loss of additional line components mentioned previously.

It is also possible to carry out the clipping processing in Step 84 by using the line component generator.

Figure 2:
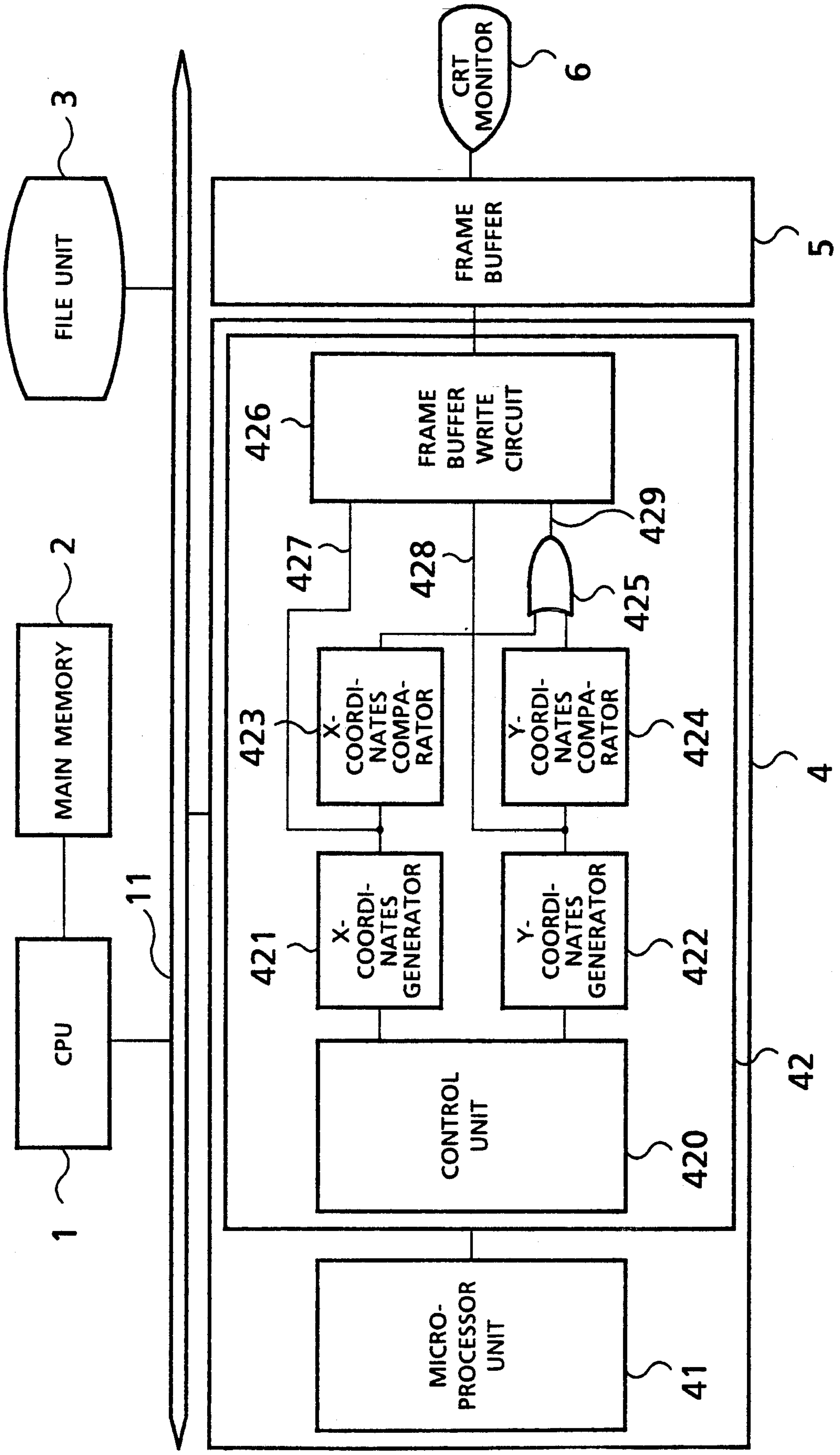
FIG. 2 is a block diagram showing other configuration of the display system.

FIG. 2 shows the configuration of the line component generator 42 in this case.

In the Figures, element 420 designates a control section which receives a setting of drawing line component information such as start and end points coordinates of line components to be drawn, from the microprocessor section 41, and controls an X coordinates generator 421 that calculates X coordinates 427 of a pixel constituting the line components and a Y coordinates generator 422 for calculating Y coordinates. Element 423 designates an X coordinates comparator which discriminates whether the coordinates of a pixel exist between the left side and the right side of the clip frame and generates a signal to indicate that the coordinates are outside of this range if it is so discriminated, and element 424 designates a Y coordinates comparator which discriminates whether the coordinates of a pixel exist between the upper and the lower sides.

Element 425 designates an OR gate which obtains a logical sum of the discrimination results of the comparators 423 and 424. Element 426 designates a frame buffer write circuit which obtains coordinates of a pixel to be written and a write restriction signal 429 from the OR gate 425 and writes a pixel in the frame buffer 5 when this signal is not being sent.

Operation of the above configuration will be explained below.

In this line component generator 42, when a pixel is going to be written in the coordinates of line components generated by the coordinates generators 421 and 422, the X coordinates comparator 423 or the Y coordinates comparator 434 discriminate whether the coordinates are within the original clip frame or not, and a write restriction signal is transmitted if the coordinates are outside of the original clip frame.

By this write restriction signal, the frame buffer write circuit 426 is restricted to write in the frame buffer. As a result, a clipping processing is realized.

When a clipping processing is carried out by the line component generator 42 as described above, it is not necessary to carry out a clipping processing in the microprocessor section 41, so that a high-speed display becomes possible.

As described above, according to the present embodiment, a first clipping is carried out in Step 82 at the beginning. Accordingly, even if the line components are longer than the clip frame it is possible to limit the occurrence of an unnecessary pixel outside of the orignal clip frame so that a high-speed display is materialized. Although description has been made of the case of a multi-window environment as an example in the present embodiment, its application is not limited to the above case but the invention can also be applied to the case of processing a display range by using two or more clip frames.

In the above embodiment, there is a case where stage differences of line components occur at a connection interface between the clip frame 91 and the clip frame 92. However, the above problem can be easily solved by applying a technique disclosed in the Japanese Patent Unexamined Publication No. JP-A-62-127972, for example, or other technique.

As described above, according to the present invention, a display system and a thick line display method are provided which can quickly realize an accurate display of a thick line without any disorder even if a display range is to be processed by two or more clip frames in a multi-window environment, etc.

We claim:

1. A method of displaying a thick line for displaying the thick line by parallel setting a reference line component and at least one additional line component which is obtained by parallel moving said reference line component, comprising:

a step of expanding a clip frame showing a display range by a predetermined width to be equal to or larger than the total width of the at least one additional line component to be set at least at one side of the reference line component and obtaining the at least one additional line component in the expanded clip frame; and a step for displaying line components within said clip frame of the at least one additional line component obtained and the reference line component within said clip frame.

2. A method of displaying a thick line for displaying the thick line by parallel setting a reference line component and at least one additional line component which is obtained by parallel moving said reference line component, comprising:

a step for carrying out a first clipping processing to the reference line component such that a first clip frame showing a display range is expanded by a predetermined width equal to or larger than a total width of the at least one additional line component to be set at least at one side of the reference line component to obtain a second clip frame and obtaining line components in the second clip frame;

a step for obtaining the at least one additional line component in addition to the reference line component after the above processing;

a step for obtaining a pixel which constitutes the reference line component that has been first clipping processed and the at least one additional line component obtained;

a step for carrying out a second clipping processing to a picture element obtained to obtain a pixel within the first clip frame; and a step for displaying the pixel obtained within the first clip frame.

3. A display system comprising:

means for displaying a thick line by parallel setting a reference line component and at least one additional line component which is obtained by parallel moving said reference line component;

means for carrying out a first clipping processing to the reference line component such that a first clip frame showing a display range is expanded by a predetermined width equal to or larger than a total width of the at least one additional line component to be set at least at one side of the reference line component to obtain a second clip frame and obtaining line components in the second clip frame;

means for obtaining a pixel which constitutes the reference line component that has been the first clipping processed and the at least one additional line component obtained;

means for carrying out a second clipping processing to the pixel obtained to obtain a pixel within the first clip frame; and means for displaying the pixel obtained within the first clip frame.

4. A display system comprising:

means for displaying a thick line by parallel setting a reference line component and at least one additional line component having start and end points obtained by parallel moving start and end points of said reference line;

means for carrying out a first clipping processing to the reference line component such that a first clip frame showing a display range is expanded by a predetermined width equal to or larger than a total width of the at least one additional line component to be set at least at one side of the reference line component to obtain a second clip frame and obtaining start and end points of line components within the second clip frame;

means for obtaining the start and end points of the at least one additional line component next to the reference line component obtained by the first clipping processing;

means for generating a pixel of the reference line component and the at least one additional line component from the start and end points of the reference line component obtained by the first clipping processing and the at least one additional line component obtained;

means for discriminating whether coordinates of the pixel generated are within the first clip frame or not; and means for displaying the pixel when the coordinates of the pixel discriminated are within the first clip frame.

5. A display system according to claim 4, wherein;

said display system includes a frame memory for storing a display image, said discrimination means compares the write address of the generated pixel in the frame memory with the address area of the frame memory corresponding to said first clip frame, and said display means writes the generated pixel in the frame memory when the write address is within said address area.

6. An information processing unit which provides a multi-window environment and has means for displaying a thick line by parallel setting a reference line component and at least one additional line component having start and end points obtained by parallel moving start and end points of said reference line component, to realize a clipping processing of the thick line which is displayed in one window by dividing the one window into two or more clip frames and by clipping processing each of the clip frames, said information processing unit comprising for each clip frame:

means for carrying out a first clipping processing to the reference line component of the thick line such that a first clip frame showing a display range is expanded by a predetermined width equal to or larger than a total width of the at least one additional line component to be set at least at one side of the reference line component and obtaining line components in the second clip frame;

means for obtaining a pixel which constitutes the reference line component that has been the first clipping processed and the at least one additional line component obtained;

means for carrying out a second clipping processing to the picture element obtained to obtain a pixel within the first clip frame; and means for displaying the pixel obtained within the first clip frame.

* * * * *